(12) United States Patent
Allen et al.

(10) Patent No.: US 6,239,907 B1
(45) Date of Patent: May 29, 2001

(54) REAR PROJECTION SCREEN USING BIREFRINGENT OPTICAL FILM FOR ASYMMETRIC LIGHT SCATTERING

(75) Inventors: Richard C. Allen, Lilydale; Jeffrey C. Chang, North Oaks; William W. Merrill, White Bear Lake; Robert S. Moshrefzadeh, Oakdale; Michael F. Weber, Shoreview, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/390,086

(22) Filed: Sep. 3, 1999

(51) Int. Cl.[7] .......................... G03B 21/56; G03B 21/60; G02B 5/30
(52) U.S. Cl. ...................... 359/443; 359/453; 359/456; 359/457; 359/460; 359/501; 359/493
(58) Field of Search .................................. 359/443, 453, 359/456, 457, 460, 501, 493, 489

(56) References Cited

U.S. PATENT DOCUMENTS

| 2,604,817 | 7/1952 | Schupp | 359/500 |
|---|---|---|---|
| 5,217,794 | 6/1993 | Schrenk | 428/220 |
| 5,473,454 | 12/1995 | Blanchard | 349/112 |
| 5,694,245 | 12/1997 | Goto et al. | 359/460 |
| 5,751,388 | 5/1998 | Larson | 349/96 |
| 5,825,542 | 10/1998 | Cobb et al. | 359/487 |
| 5,825,543 | 10/1998 | Ouderkirk et al. | 359/494 |
| 5,867,316 | 2/1999 | Carlson et al. | 359/500 |
| 6,002,500 | * 12/2000 | Kim | 359/15 |
| 6,163,402 | * 12/2000 | Chou et al. | 359/443 |

FOREIGN PATENT DOCUMENTS

| 381 417 A1 | 8/1990 | (EP) . |
|---|---|---|
| 736 796 A1 | 10/1996 | (EP) . |
| 905 556 A2 | 3/1999 | (EP) . |
| 2 235 990 | 3/1991 | (GB) . |
| 97/41484 | 11/1997 | (WO) . |
| WO 98/52099 | 11/1998 | (WO) . |

\* cited by examiner

*Primary Examiner*—Russell Adams
*Assistant Examiner*—Magda Cruz
(74) *Attorney, Agent, or Firm*—William D. Miller

(57) ABSTRACT

A dispersing element for a rear projection screen assembly is sensitive to the polarization of the light passing through the element. In particular, the element disperses light having a first polarization differently from light having a second polarization orthogonal to the first polarization. The dispersing element may be aligned with a polarization axis neither parallel nor perpendicular to the polarization of the light passing through the element. The dispersing element may also be employed with a polarizer to remove unwanted light that propagates through the dispersing element. The dispersing element may also be rotatably mounted relative to a polarized light source so as to vary the angle between the polarization axis of the element and the polarization direction of the light.

32 Claims, 9 Drawing Sheets

REAR PROJECTION SCREEN USING BIREFRINGENT OPTICAL FILM FOR ASYMMETRIC LIGHT SCATTERING

BACKGROUND

This invention relates generally to transmissive screens, and more particularly to transmissive screens suitable for use in rear projection systems.

Rear projection screens are generally designed to transmit an image projected onto the rear of the screen into a viewing space. The viewing space of the projection system may be relatively large (e.g., rear projection televisions), or relatively small (e.g., rear projection data monitors). The performance of a rear projection screen can be described in terms of various characteristics of the screen. Typical screen characteristics used to describe a screen's performance include gain, viewing angle, resolution, contrast, the presence of undesirable artifacts such as color and speckle, and the like. It is generally desirable to have a rear projection screen that has high resolution, high contrast and a large gain. It is also desirable that the screen spread the light over a large viewing space. Unfortunately, as is described more fully below, as one screen characteristic is improved, one or more other screen characteristics often degrade. For example, in order to increase the screen gain using the same overall structure, one must decrease the viewing angle over which the screen is readily observable. As a result, certain tradeoffs are made in screen characteristics and performance in order to produce a screen that has overall acceptable performance for the particular rear projection display application.

Thus, there remains a need for screens that have improved overall performance while meeting the minimum performance criteria necessary for the rear projection display application in which the screen is used.

SUMMARY

Generally, the present invention relates to a dispersing element for a rear projection screen assembly that is sensitive to the polarization of the light passing through the element. In particular, the element disperses light having a first polarization differently from dispersing light having a second polarization orthogonal to the first polarization. The dispersing element may be aligned with a polarization axis neither parallel nor perpendicular to the polarization of the light passing through the element. The dispersing element may also be employed with a polarizer to remove unwanted light that propagates through the dispersing element. The dispersing element may also be rotatably mounted relative to a polarized light source so as to vary the angle between the polarization axis of the element and the polarization direction of the light.

In one embodiment, a rear projection system includes a light source that projects light having a polarization parallel to a source polarization direction. A transmission screen is disposed to receive light from the light source, and has a first scattering layer with a first scattering distribution for light having a polarization parallel to a first screen polarization axis and a second scattering distribution for light having a polarization parallel to a second screen polarization axis orthogonal to the first polarization axis. The angle between the first polarization axis and the source polarization direction is selected to be greater than 0° and less than 90°.

In another embodiment, a rear projection system has a light source that projects light having a polarization parallel to a source polarization direction. A transmission screen is disposed to receive light from the light source. The transmission screen includes a first scattering layer with a first scattering distribution for light having a polarization parallel to a first screen polarization axis and a second scattering distribution for light having a polarization parallel to a second screen polarization axis orthogonal to the first polarization axis. The transmission screen also includes a polarizing layer oriented to transmit light polarized parallel to the source polarization direction, and to prohibit transmission of light polarized perpendicular to the source polarization direction.

In another embodiment, a display device includes a light source that projects light having a polarization parallel to a source polarization direction. A transmission screen is disposed to receive light from the light source. The transmission screen has a first scattering layer with a first scattering distribution for light having a polarization parallel to a first screen polarization axis and has a second scattering distribution for light having a polarization parallel to a second screen polarization axis orthogonal to the first scattering axis. The first scattering layer is rotatably mounted in the display device. Rotation of the first scattering layer results in a variation of an angle between the first polarization axis and the source polarization direction.

In some embodiments, the light source is an image light source that projects an image of polarized light towards the transmission screen.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
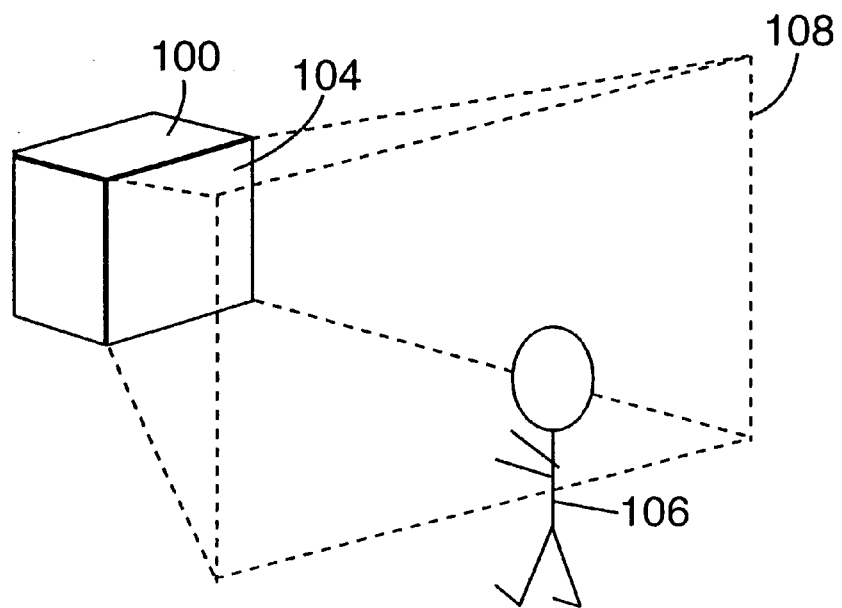
FIG. 1 illustrates a rear projection display.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally applicable to a number of different screen assemblies and is particularly suited to screen assemblies used in rear projection systems. In particular, the present invention is advantageous in applications where the most likely position of the viewer, or viewers, is known: the invention is useful in directing light from all portions of the screen to the most likely viewer position, to increase brightness uniformity across the screen.

The rear projection display 100 is described with reference to FIGS. 1 and 2. The display includes a light source 102 that projects polarized light towards the screen. For example, the light source 102 may be an image projector that projects a polarized image onto the rear side of a screen 104. The image is transmitted by the screen 104 so that a viewer 106, located at some point beyond the screen 104, can see the image projected through the screen 104. The rear projection display 100 may be, for example, one or more rear projection televisions, or one or more rear projection computer monitors, or any other rear projection displaying apparatus, such as ILA® projection technology available from Hughes-JVC Corporation, DLP® digital light processing projection system available from Texas Instruments, and Scanned Linear Grating Light Valve® available from Silicon Light Machines.

In accordance with one embodiment of the invention, a liquid crystal display (LCD) based image projecting light source 102 can be used in the rear projection display 100 to project an image onto the rear surface of the screen assembly 104. The rear projection display may vary in size from relatively small data monitors, to large screen televisions and video walls. The projection display 100 may also rely on a folded image projection path within its housing, such as the various projection systems described in European Patent Application EP783133, entitled "Projecting Images", the contents of which are incorporated herein by reference. As will be appreciated from the descriptions below, such systems particularly benefit from the use of the various screen assemblies described herein below.

A more detailed description of the various screen characteristics is now provided. One important screen characteristic is gain. The gain of a screen represents the screen's brightness as a function of viewing angle. The gain is typically calibrated using an ideal Lambertian reflector with the gain of the ideal Lambertian standard set at 1 for all angles. The peak gain of a screen (or screen element) corresponds to the highest gain at some angle. For example, the peak gain of a bulk diffuser screen, eliminated from behind at normal incidence, is typically observed for the light transmitted through the screen at an angle normal to the screen surface.

Another important screen characteristic is viewing angle. The viewing angle of a screen, as used herein, is the angle at which the gain of the screen drops to half of the peak gain. In many situations, the viewing angle corresponds to the difference between the angle of maximum luminance and the angle at which the luminance of the transmitted image drops to half of the maximum luminance of the screen. Typically the maximum luminance occurs for light transmitted in a direction normal to the screen surface.

The particular application of a rear projection system determines the desired viewing angle. It is typically advantageous to control the angular dependence of the screen's luminance by directing light to that region where the viewer is most likely to be situated. For example, where the rear projection display is a data monitor, the viewer is typically positioned centrally relative to, and within approximately one to three feet from, the screen. The viewer's eyes may be positioned above a line normal to the center of the screen, but the viewer typically does not view the screen from a distance as much as one or two feet above the screen. Furthermore, for reasons of privacy or security, it may be desirable to reduce the luminance emerging from the screen at an angle of e.g. 30° or more relative to a normal to the screen. This reduces the possibility that someone positioned far away from the axis of the screen, and perhaps having no authority to view the contents of the screen, sees the information on the screen.

Another application for a rear projection screen is in a home television system, where it is generally desired to direct the angular dependence of the screen's luminance over large horizontal angles, since it is common for viewers to be seated at a position other than directly in front of the television screen. On the other hand, few viewers view the television screen from a position significantly above or below the screen, and therefore it is commonly desired to reduce the angular dependence of the screen's luminance in the vertical direction. Accordingly, the preferred viewing angles for a television are typically smaller in the vertical direction than in the horizontal direction. In certain applications, the vertical divergence of the light from a television screen may preferably be tilted downwards relative to a normal from the television screen. This accommodates, for example, viewers watching the television from the floor. In this example, it is not as important to deflect light upwards from the television screen, since viewers typically do not stand to watch television for any length of time.

An important characteristic of a screen is its ability to avoid unwanted color or speckle effects. In certain screens color may be observed as a random pattern of differently colored, pixel-like spots on the screen. Such color artifacts typically result from wavelength-dependent effects, such as scattering in which different wavelengths are scattered in different directions or with different efficiency. As a result of the wavelength-dependent effects, different colors may become physically separated and observable on the viewer side of the projection screen. Increasing the thickness of the screen until the observer cannot resolve any color separation may be used to reduce color artifacts on a screen using a bulk diffuser. The thickness of the bulk diffuser is not necessarily a free variable to be selected only to reduce color effects, and so the diffuser thickness is typically selected to be a compromise value that optimizes several different screen characteristics.

The resolution provided by the rear projection screen is becoming more important as rear projection displays are used in applications with increasingly higher resolution requirements, for example high definition television. The resolution of a screen is generally defined as a measure of the finest detail that can be distinguished in an image projected on the screen.

Figure 2A:
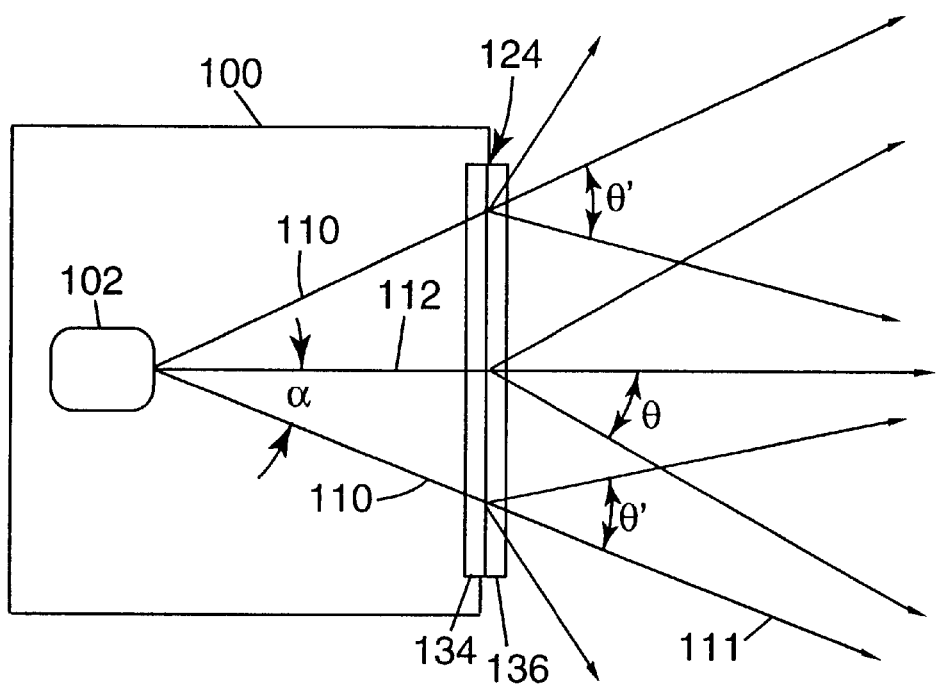
FIGS. 2A and 2B illustrate cross-sectional views of particular embodiments of rear projection displays.

Considering now the illustration of FIG. 2A, the image light 110 produced by the image projector 102 is directed to the screen assembly 124. The screen assembly 124 typically includes several different layers for controlling the image seen by the viewer, including a dispersing layer 134 and a glass plate 136 to provide support. The dispersing layer 134 disperses, or diffuses, light passing through a particular point of the screen into a cone angle, so that a viewer on the far side of the screen can detect image light from that particular point. It will be appreciated that the dispersing layer 134 typically disperses light from all points across the screen so that the viewer can see the entire image projected onto the screen assembly 124 by the image projector 102.

Here, the term "disperse" is employed to refer to any process that changes the direction of the image light, for example scattering, diffusion, diverging or converging using lenses, or any other approach, which produces a viewing angle in one or more directions. The use of the term does not necessarily imply, nor exclude, wavelength dependent characteristics.

The on-axis ray of light 112 is dispersed by the dispersing layer 134 to produce a viewing angle of 2θ. The off-axis light rays 110 from the image projector 102 illuminate the edge of the screen assembly 124, and are separated from the on-axis ray 112 by an angle of α. When the off-axis rays 110 pass through the dispersing layer, they are dispersed by ±θ' about a ray 111 that is at an angle α relative to a screen normal. The angle θ' may or may not be equal to angle θ, as the specifics of the scattering event will depend upon other optical properties of the rear projection screen.

Figure 2B:
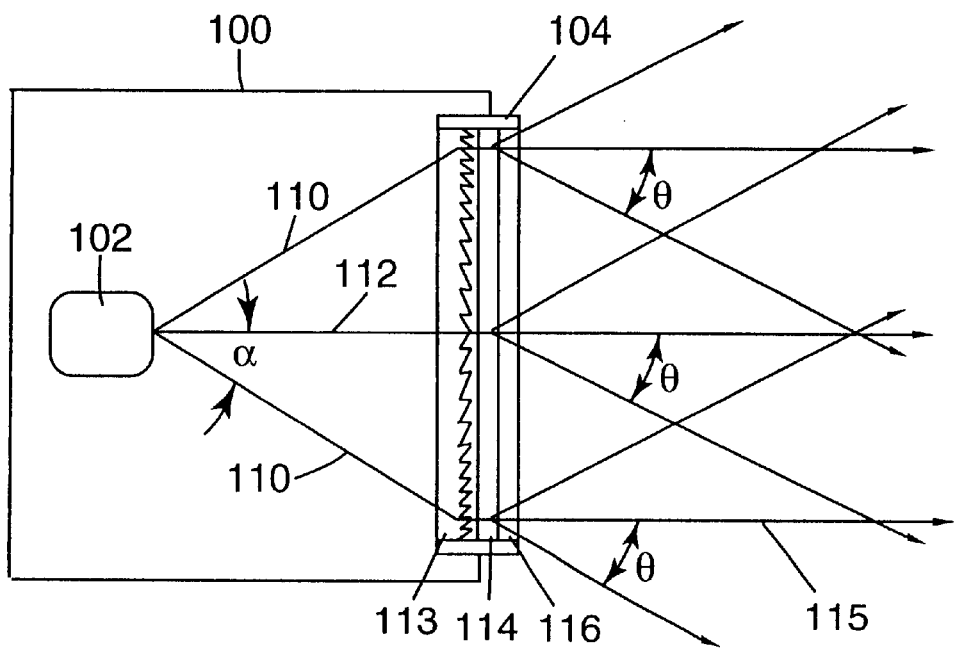

Another screen assembly 104 is illustrated in FIG. 2B, in which light 110 from the image projector 102 is collimated by a Fresnel lens 113 before being incident on the dispersing layer 114. The dispersing layer 114 is supported on a support layer 116, which may be, for example, a glass screen. In this case, the dispersed light transmitted through the edge of the screen 104 is dispersed about a ray 115 that is normal to the screen. One advantage of the screen assembly 104 over the screen assembly 124 without any Fresnel lens is that the angle through which light from the edge of the screen has to be dispersed in order to be detected by an on-axis viewer is reduced. Since the intensity of dispersed light generally decreases with increased angle, the image seen by a viewer on the screen assembly 104 having a Fresnel lens typically appears to be more uniformly intense across the screen than where no Fresnel lens is used.

Figure 3:
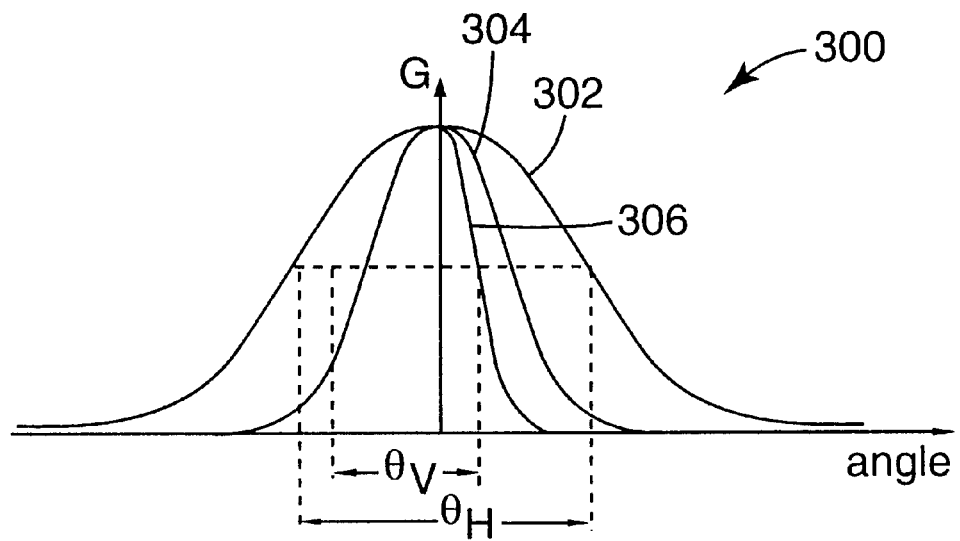
FIG. 3 shows curves of optical gain plotted against angle of view, for vertical and horizontal angles.

One example of a desired gain characteristic for a television screen is illustrated in FIG. 3. The figure illustrates two curves, 302 and 304, that relate gain to angle of viewing, θ, as might be obtained for a screen used in a television. The broader curve 302 illustrates the gain, G, as a function of angle, θ, in a horizontal direction. In other words, curve 302 describes the brightness of the screen perceived by a viewer as the viewer moves sideways away from the screen. The horizontal viewing angle, $\theta_H$, is the angle at which the luminance of the horizontally dispersed light falls to half of the maximum luminance.

The narrower curve 304 represents the dependence of the gain as a function of angle relative to the screen viewed in a vertical direction. As has been discussed above, it is typically desired in a television application that the image from the screen be directed vertically in a relatively narrow range of angles in order to avoid throwing away light that would otherwise illuminate the floor and ceiling. This increases the screen brightness perceived by the viewers. The vertical viewing angle, $\theta_V$, the angle at which the light intensity is one half of the maximum intensity, is less than the horizontal viewing angle, $\theta_H$.

Accordingly, it should be appreciated that there are several applications for rear projection display screens in which the viewing angle is not symmetric, in other words, the vertical viewing angle, $\theta_V$, is different from the horizontal viewing angle, $\theta_H$. Also, the viewing angle in one direction, for example the vertical direction, need not be a symmetric function of angle. For example, the gain in the vertical direction may fall more rapidly with increasing angle above the screen axis than for decreasing angle below the screen axis, as is shown for curve 306, which has its peak gain at θ=0°, but which sheds more light downwards than upwards.

This invention is concerned with the use of a polarization-sensitive, light dispersing optical devices to produce different viewing angles in the horizontal and vertical directions. A polarization-sensitive light dispersing optical device scatters, or diffuses, transmitted light by a greater or lesser amount depending on the polarization of the incident light. The viewing angle may be the same in the horizontal and vertical directions, or may be different.

Figure 4:
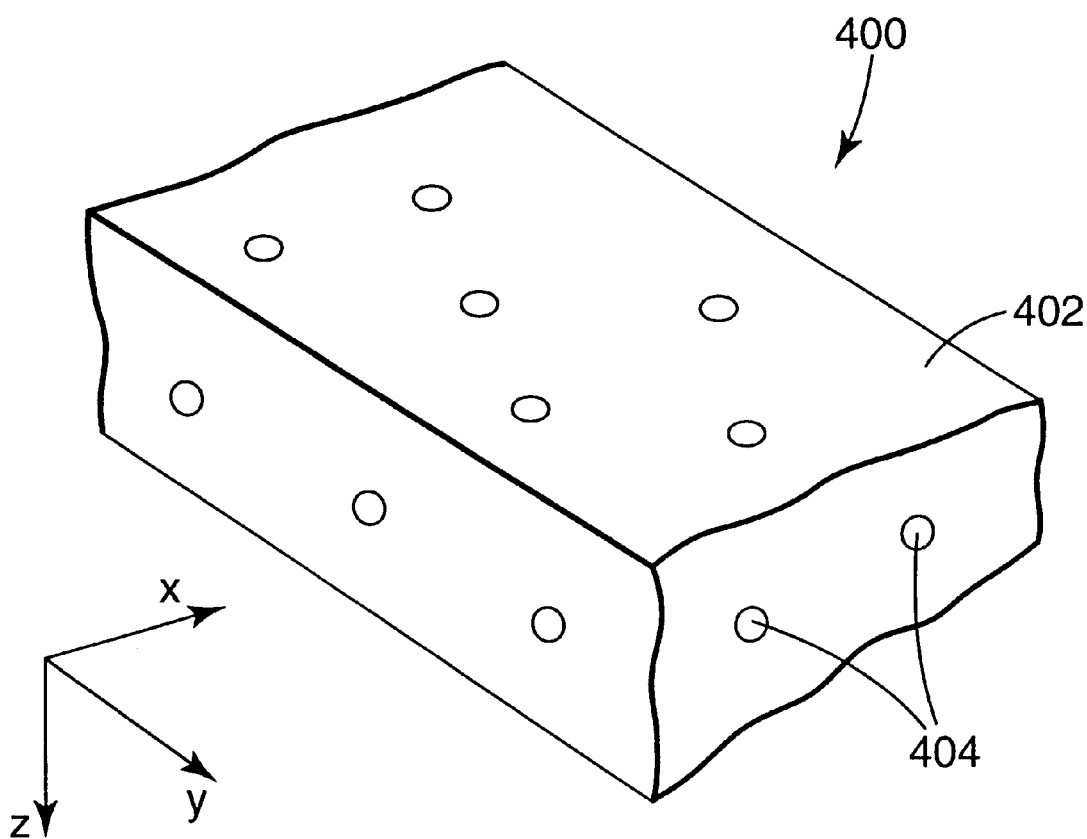
FIG. 4. shows a polarization-sensitive scattering optical device (PSSD) according to one particular embodiment of the present invention.

One particular embodiment of such an optical device is illustrated in FIG. 4. The optical device 400 includes a continuous material phase 402, for example formed from a polymer, that contains discrete bodies 404 of another material embedded therein. The bodies 404 may be formed from a disperse phase of a polymer different from the continuous phase 402. The bodies 404 may also be formed from liquid crystals or other dielectric material having a refractive index different from the refractive index of the continuous phase. The embedded bodies 404 may have different morphologies, and may be, for example, particulate or fibrous.

The device 400 is described with reference to the Cartesian axis set. The convention used here is that light propagates through the device 400 substantially in the z-direction, while the x- and y-axes denote directions perpendicular to the z-axis. The refractive index of the continuous phase 402 is described with reference to the axes, x, y, and z. The continuous phase has three refractive indices, $n_x$, $n_y$, and $n_z$, each describing the refractive index experience by light propagating through the continuous phase 402 where the electric vector of the light is aligned parallel, respectively, with the x-, y- and z-axes. The continuous phase 402 may be isotropic, where $n_x=n_y=n_z$. The continuous phase 402 may be uniaxially birefringent, where one of the refractive indices is different from the others, for example $n_x=n_z\neq n_y$. The continuous phase 402 may also be biaxially birefringent, where the three refractive indices are different from each other, $n_x\neq n_y\neq n_z$. Likewise, the bodies 404 may be isotropic, uniaxially birefringent, or biaxially birefringent. For the optical device 400 to be polarization sensitive, either the continuous phase 402 or the bodies 404 are birefringent, or both the continuous phase 402 and the bodies 404 may be birefringent.

Scattering occurs when there is a refractive index difference between the bodies 404 and the continuous polymer phase 402. In general, the degree of scattering increases for larger differences in refractive index. In one embodiment, the continuous phase 402 is isotropic and the bodies 404 are birefringent. Thus, scattering occurs for x-polarized light where $n_{cx}\neq n_{px}$, while little scattering for y-polarized light occurs if, for example, $n_{cy}\approx n_{py}$, where the refractive index difference relative to the y-axis, $\Delta n_y=|n_{cy}-n_{py}|\approx 0$. The additional subscript "c" indicates the refractive index of the continuous phase 402 and the subscript "p" indicates the refractive index of the bodies 404. In illustration, $n_{cx}$ is the refractive index of the continuous phase 402 for light polarized parallel to the x-axis, while $n_{py}$ is the refractive index of the bodies 404 for light polarized parallel to the y-axis. Thus, birefringence leads to polarization dependent scattering.

For a polarization-sensitive light dispersing optical device, where the refractive index difference, Δn, is less than 0.03 to 0.05 depending upon other factors regarding the nature of the system, light is transmitted through the optical device substantially unscattered. Therefore, the polarization-sensitive scattering optical device may scatter light propagating therethrough with a first polarization, while permitting light having a second polarization, orthogonal to the first polarization, to pass through substantially unscattered. The degree of scattering may be large, in which case light in the first polarization may be scattered through a large angle, or may be substantially backscattered.

The refractive index differences for the two polarizations may be selected so that neither polarization passes without significant scattering. The polarization-dependent refractive index differences may also be selected so that each polarization is scattered by a selected amount. For example, light in one polarization may be transmitted through the optical device with diffuse forward scattering, while light in the orthogonal polarization is backscattered, so that it is substantially reflected by the optical device.

The characteristic scattering of the film 400 is dependent on several parameters in addition to the refractive index difference. The parameters include the volume fraction of the embedded bodies, the characteristic dimension of the bodies and the total thickness of the optical device.

The degree of light scattering is, in general, inversely proportional to the z-axis characteristic dimension of the embedded body, where the z-axis is the direction of light propagation into the body. Thus, scattering generally increases where smaller embedded bodies are used. Furthermore, where the embedded bodies have elongated shapes, then the scattering may become direction dependent. Several different embodiments of polarization-sensitive light scattering bodies are disclosed in U.S. Pat. No. 5,751,388, which is incorporated herein by reference.

Figure 5A:
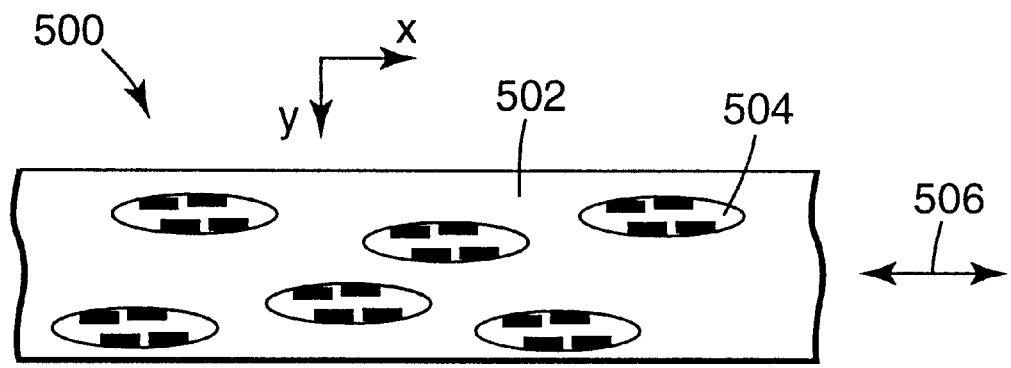
FIGS. 5A and 5B show PSSDs according other embodiments of the present invention.

In one embodiment of the optical device 500, illustrated in FIG. 5A, the embedded bodies 504, disposed within a continuous matrix 502, have a smaller dimension in the y-direction than the x-direction. The embedded bodies 504 may be, for example, drops of liquid crystal in a polymer continuous matrix 502. The elongated axes of the bodies 504 are aligned parallel to a common axis, for example by stretching the device 500 along the axis 506. In another embodiment, illustrated in FIG. 5B, the optical device 520 includes polymer fibers 524 embedded within a polymer matrix 522. The fibers 524 are aligned parallel to a common axis within the matrix 522. Other approaches to producing polarization-sensitive light scattering bodies include the embedding of polymer drops within a polymer matrix, and stretching the matrix, for example as disclosed in U.S. Pat. No. 5,825,543 and incorporated herein by reference; embedding birefringent crystals (or similar particles) within a matrix, either birefringent or nonbirefringent; and other methods disclosed in U.S. Pat. No. 5,751,388.

Figure 5B:
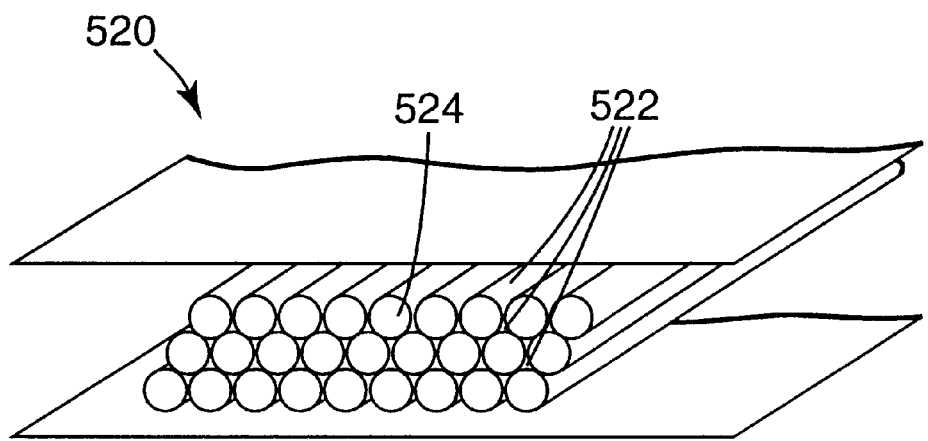

Particles elongated along a first axis cause scattering to occur at higher angles in a second orthogonal axis than for particles not elongated, although the specifics of the scattering profiles are dependent upon a number of properties of the optical device. The particle dimensions relative to two orthogonal axes may be selected to produce a desired scattering profile. In other words, a selected ratio of the particle dimension in the x-direction and the particle direction in the y-direction may be introduced to produce a desired value for the ratio $\theta_x/\theta_y$, where $\theta_x$ and $\theta_y$ respectively represent the viewing angle measured in the x-z plane and y-z plane. For example, an optical device as shown in FIG. 5B may be used in a screen to produce the different horizontal and vertical viewing angles illustrated in FIG. 3, where the magnitude of the fiber length is larger than the fiber diameter, to produce unequal dispersion in the vertical and horizontal directions.

The volume fraction of the embedded particles affects the scattering of light in the present invention. Within limits, increasing the volume fraction of the embedded particles tends to increase the amount of scattering that a light ray experiences after entering the optical device for both matched and mismatched directions of polarized light. This factor is important for controlling the reflection and transmission properties of the optical device. However, if the volume fraction of the embedded particles becomes too large, light scattering diminishes. One reason for this phenomenon is that when the embedded particles are close together, relative to the wavelength of the light passing through the optical device, the particles tend to act together as a small number of larger effective particles.

The thickness of the optical device is also an important control parameter which can be manipulated to affect reflection and transmission properties in the present invention. As the thickness of the optical device is increased, while maintaining the same particle density, diffuse reflection is also increased, and transmission, both specular and diffuse, decreases.

Accordingly several parameters may be adjusted to provide an optical device with a particular polarization sensitive scattering characteristic. Although not limitative, one set of parameter ranges that may be used for a polarization-sensitive, light dispersing optical device that diffusely transmits one selected polarization of light is:

Δn, for the scattering polarization, between about 0.03 and 0.25;

$d_z$, between about 0.1 $\mu$m and about 20 $\mu$m;

volume fraction between about 5 and 50 percent; and optical device thickness between about 5 $\mu$m and 10,000 $\mu$m.

It will be appreciated that polarization-sensitive, diffusely transmitting optical devices may operate outside these ranges.

The terms "specular transmission" and "specular transmittance" are used to refer to the transmission of rays through the polarization-sensitive, light scattering device in a substantially specular direction, without any significant diffusion or dispersion. The terms "diffuse transmission" and "diffuse transmittance" are used to refer to transmission through the optical device which is diffusive, or dispersive. The terms "total transmission" and "total transmittance" refer to the combined transmission of all light through an optical body. Thus, the total transmission is the sum of the specular and diffuse transmission.

Dimensional alignment has an effect on the scattering behavior of the embedded particles. In particular, in optical bodies made in accordance with the present invention, aligned scatterers do not scatter light symmetrically about the directions of specular transmission as do randomly aligned scatterers. For example, embedded bodies that are elongated to resemble rods within the continuous phase matrix scatter light primarily in a direction perpendicular elongation axis, and the scattered light appears as a band of light in the plane perpendicular to the elongation direction with an intensity that decreases with increasing angle away from the incident direction. By tailoring the geometry of the embedded bodies, some control over the distribution of scattered light can be achieved in the transmissive hemisphere.

Suitable diffuser particles include phase-separated particles from extrusion and polymer particles, especially preformed beads. Non-birefringent particles may be made from acrylic polymers and copolymers, polyurethane and polycarbonate may be used as non-birefringent resins, while birefringent particles may be made from semicrystalline (co)polymers, such as polyethylene naphthalate (PEN), polyethylene terphthalate (PET), a copolymer of PEN and PET (CoPEN), and syndiotactic-polystyrene, polyamides, and a wide variety of non-absorbing materials.

One important feature of the present invention is that the scattering angle for the transmitted light is dependent on the relative angle between the polarization vector of the light incident on the optical device and the respective axes of the optical device. This may be used to select a particular viewing angle. Consider the optical device 520 illustrated in FIG. 5B, where the bodies 524 are isotropic and have a refractive index of $n_p$, and the continuous phase polymer 522 is birefringent with refractive indices $n_{cx} \neq n_p$, and $n_{cy} \approx n_p$, so that y-polarized light is substantially specularly transmitted by the optical device, while x-polarized light is diffusely transmitted. In this example, the incident light is horizontally polarized, parallel to the x-axis.

Figure 6A:
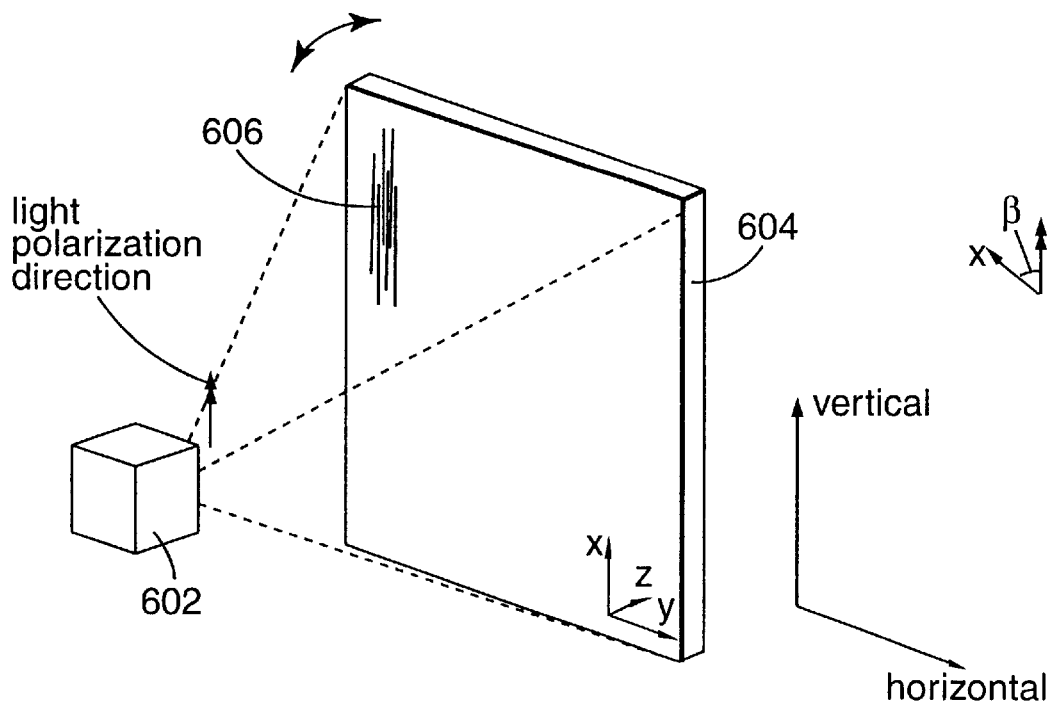
FIG. 6A illustrates a rear projection system using a PSSD according to an embodiment of the invention.

An embodiment of a projection system is illustrated in FIG. 6A, which shows an image light source 602 transmitting light towards a screen 604 that includes a dispersing element with a construction similar to that of the optical device 520 in FIG. 5B. The image light source 602 transmits light having a polarization, indicated by the double headed arrow, parallel to the vertical direction. The screen 604 is oriented with the elongation direction of the bodies 606, some of which are shown schematically, parallel to the x-direction. The angle β is defined as being the angle between the x-axis and the polarization direction of the light, as shown. For the particular orientation of the screen illustrated, the x-axis is parallel to the direction of light polarization, and so β=0°. Since the properties of the film are different for light polarized parallel to the x-axis and to the y-axis, the x- and y-axes may be termed polarization axes.

Figure 6D:
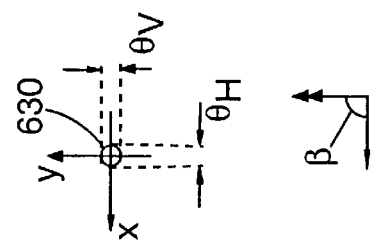
FIGS. 6B–6D illustrate light scattering profile for different angles between a screen scattering axis and the polarization direction of incident light for the embodiment illustrated in FIG. 6A.
Figure 6C:
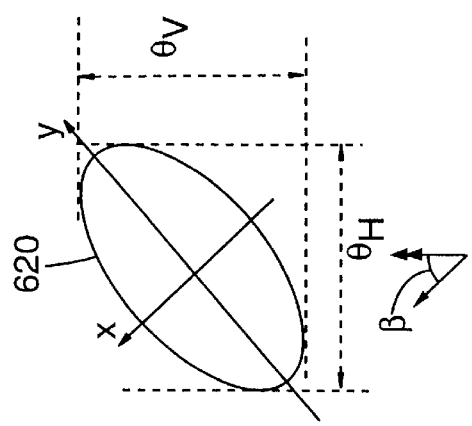
Figure 6B:
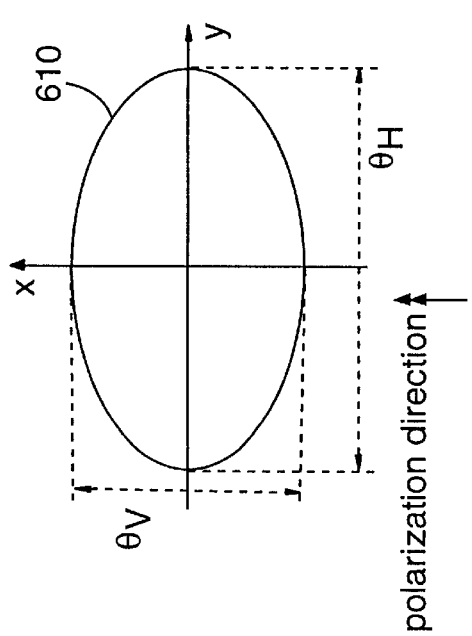

The scattering profile of the light diffusely transmitted by the screen 604 is illustrated by the curve 610 in FIG. 6B. The ellipse represents luminance or gain that is half the peak luminance or gain, as a function of angle, θ, for light normally incident on the screen 604. The elliptical nature of the curve 610 illustrates one embodiment of the present invention where the viewing angle in the vertical direction, $\theta_v$, is less than the viewing angle in the horizontal direction, $\theta_H$. The curve 610 represents the scattering profile through which light, polarized in the direction of the double-headed arrow, is scattered on passing through the optical device. Here, the light is polarized parallel to the x-axis of the optical device.

When the screen 604 is rotated about the axis of incidence, for example β=45°, then the light incident on the screen 604 has components of both x- and y-polarization. The y-component is transmitted approximately specularly, while the x-component is diffusely transmitted. Both $\theta_v$ and $\theta_H$ are reduced relative to the case shown in FIG. 6B, as shown in FIG. 6C. The major axis of the oblate scattering profile 620 remains parallel to the y-axis. The angular size of the scattering profile is diminished, because there is less optical power in the diffusely scattered light, and there is more optical power in the specularly transmitted light.

Light is largely specularly transmitted by the screen 604 when the screen 604 is rotated so that the y-axis is parallel to the polarization direction, at β=90°, as illustrated in FIG. 6D. Consequently, the scattering profile is substantially circular as shown by the small circle 630, and. the viewing angles $\theta_v$ and $\theta_H$ are significantly reduced.

Figure 7:
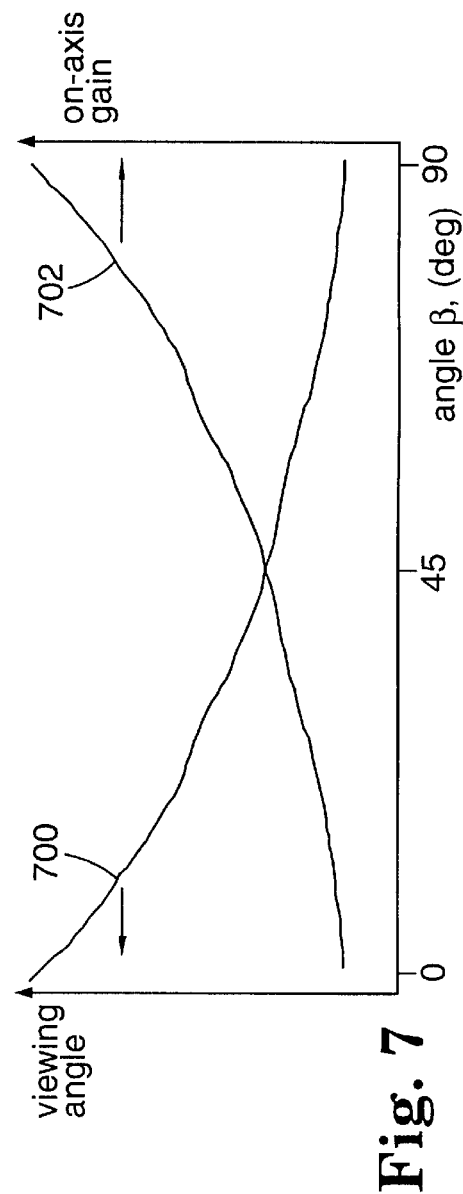
FIG. 7 shows a graph illustrating the dependence of gain and viewing angle on the relative orientation of a PSSD to a polarized light source.

This behavior may also be illustrated in terms of the viewing angle and on-axis gain. Curves 700 and 702 shown in FIG. 7 respectively illustrate the dependence of the viewing angle and on-axis gain as a function of angle, β, between the polarization direction and the x-axis. The viewing angle decreases from a maximum value at β=0° to a minimum at β=90°, while the on-axis gain increases from a minimum value at β=0° to a maximum at β=90°.

One advantage derived from the dependence of viewing angle on the angle β is that the viewing angle provided by the optical device may be adjusted, which results in a concomitant change in on-axis gain. For example, where a polarization-sensitive, diffusely transmissive optical device is used as a scattering screen for a source of polarized light, the optical device may be rotated about the optical axis so as to change β, and thus select different values for viewing angle and gain. This may be advantageous in situations of changing ambient light conditions, where a user is willing to trade-off viewing angle for gain.

Figure 8A:
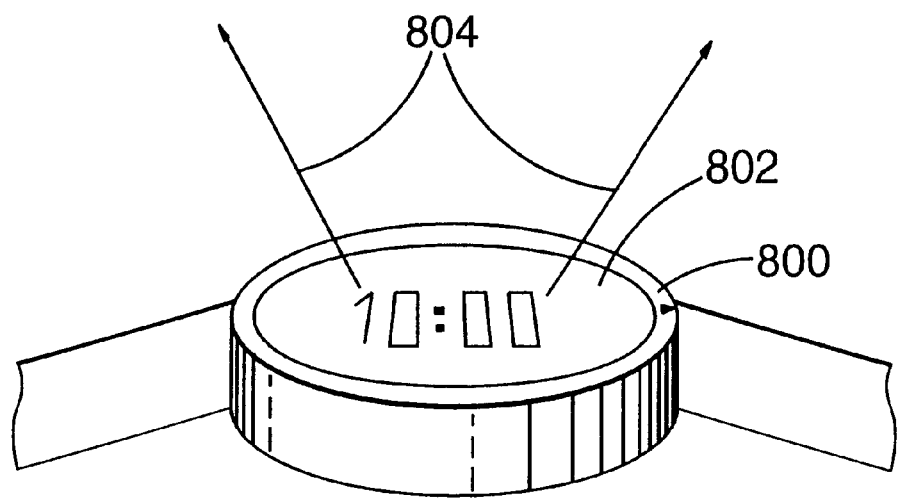
FIGS. 8A and 8B illustrate the use of a rotatable PSSD to tune viewing angle.
Figure 8B:
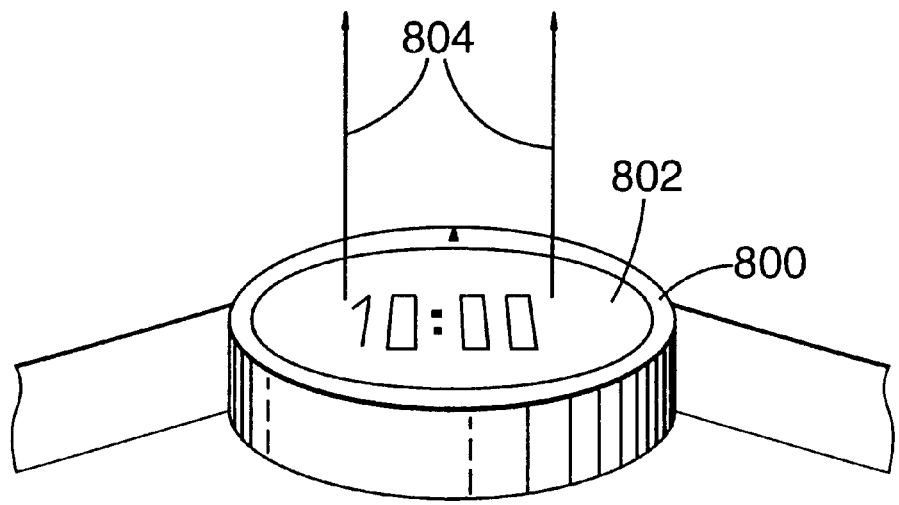

A polarization-sensitive, diffusely transmissive optical device may be used in a backlit display. For example, a watch 800 may be equipped with a rotatable, polarization dependent diffusely transmissive optical device 802, as illustrated in FIG. 8A. Under low lighting conditions, the optical device may be rotated to a low gain, large viewing angle position so that the user can make use of the large viewing angles: the light rays 804 propagate from the device 802 over a large range of angles. Under bright lighting conditions, more light from the watch face may be needed for the user to see the information against a bright background. In such a case, the user may rotate the optical device 802 to a position of higher gain and lower viewing angle, as illustrated in FIG. 8B. The convenience of high viewing angle may be reduced, but the user is able to see the light from the watch face more clearly under unfavorable lighting conditions.

Displays with tunable viewing angle/gain may be used in other situations, such as instrument display panels, for example in avionics applications, where ambient lighting conditions change rapidly. Such displays and screens may also be used for reducing the ability of a person positioned off-axis to see information on the screen, for example in applications where privacy is important.

A polarization-sensitive, diffusely transmissive optical device may be used for dispersing light in selected directions. Such an optical device may be used alone, or in conjunction with other means to disperse light into the particular desired horizontal and vertical viewing angles. One particular example of a combination transmission screen 900 is illustrated in FIG. 9A. The transmission screen 900 includes a first layer 902 of a polarization-sensitive, asymmetrically-diffusely transmitting optical layer, that diffuses light to a greater degree in one direction than another. The screen 900 also includes an isotropically scattering, bulk diffuser optical layer 904, which diffuses light isotropically. For example, the polarization-sensitive optical device 902 may produce a horizontal viewing angle of 30° and a vertical viewing angle of 10°. The isotropically scattering optical device 904 may be a 20° scatterer, so that the resultant viewing angle of light transmitted through the screen 900 is increased in both the horizontal and vertical directions, with the horizontal viewing angle being greater than the vertical viewing angle.

Figure 9B:
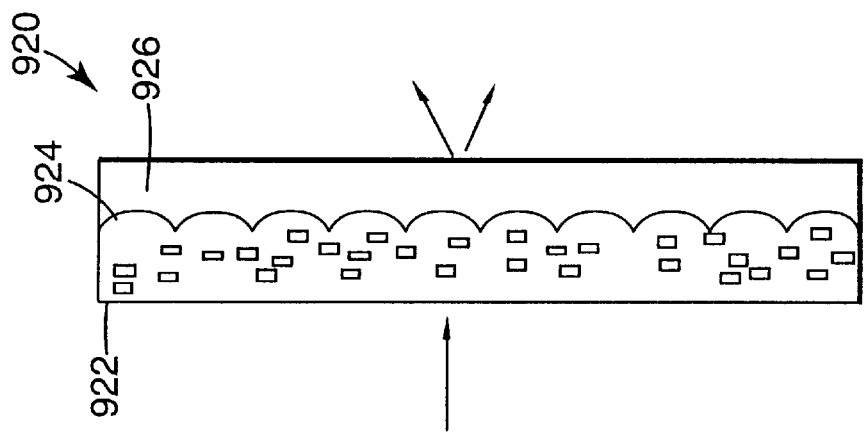
FIGS. 9A and 9B illustrate PSSD's combined with other light diffusing elements.
Figure 9A:
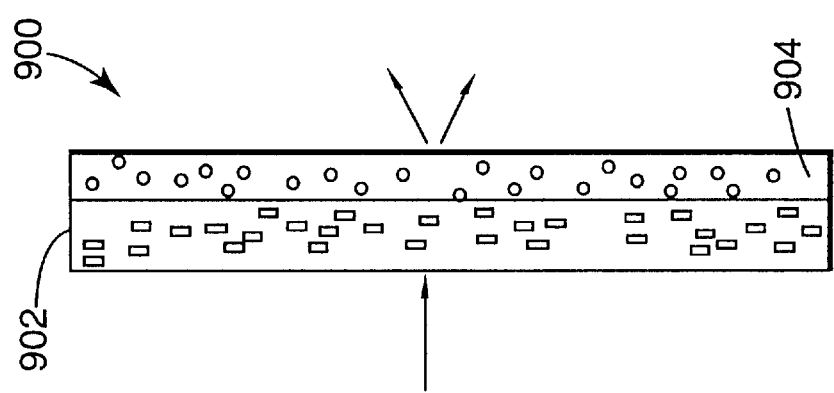

Another embodiment of a polarization-sensitive, diffusely transmitting screen 920 is illustrated in FIG. 9B. The polarization-sensitive scattering optical device 922 has a scattering surface 924 that is contoured in such a way as to disperse the light passing therethrough. The scattering surface 924 may be a lenticular surface that diverges light in one dimension, as illustrated. It should be understood that the surface 924 may be any other suitable light dispersing surface, such as a randomly roughened surface, microholographic scattering surface, microlensed surface and the like. A low refractive index layer 926 may be attached on the output side of the scattering surface 924 for ease of manufacture. This permits the polarization-sensitive scattering optical device 922, having a structured output surface 924 to be integrated with other layers of the screen without the need of an air gap. Alternatively, the scattering surface 924 may be located on an input side of the polarization-sensitive scattering optical device 922.

A polarization-sensitive scattering optical device may be included in different types of transmission screen assemblies. Many different combinations of optical devices may be used in a screen assembly, two of which are illustrated here. In FIG. 10A, a screen assembly 1000 is fabricated from four layers. A Fresnel lens 1002 may be embedded in a low refractive index layer 1004, as taught in U.S. patent application Ser. No. 09/229,198, filed on Jan. 13, 1999, and incorporated herein by reference. The low refractive index optical layer 1004 may be laminated to an input surface 1006 of a polarization-sensitive, diffusely transmitting optical device 1008 that is laminated, or otherwise attached to, an isotropically scattering layer 1010, such as a bulk diffusing film. It should be understood that other embodiments of polarization-sensitive scattering optical devices may be included in such a screen assembly structure, in addition to the particular embodiment illustrated herein. A Fresnel lens 1002 may be useful for collimating, or at least redirecting, light received from an image projector (not shown), so as to maintain brightness uniformity across a screen surface. The screen 1000 may use a surface diffuser in place of the isotropically scattering layer 1010.

Figure 10B:
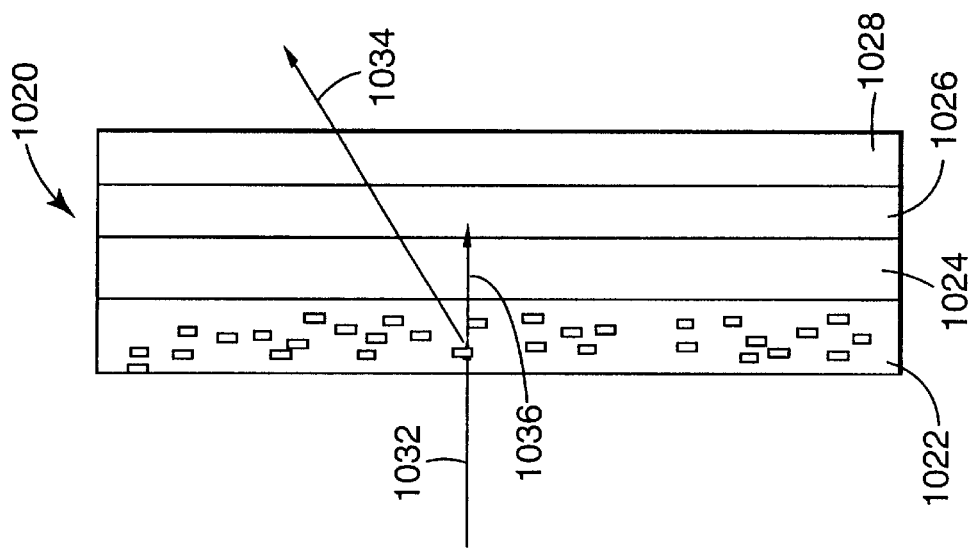
FIGS. 10A and 10B illustrate different screen assemblies using a PSSD.
Figure 10A:
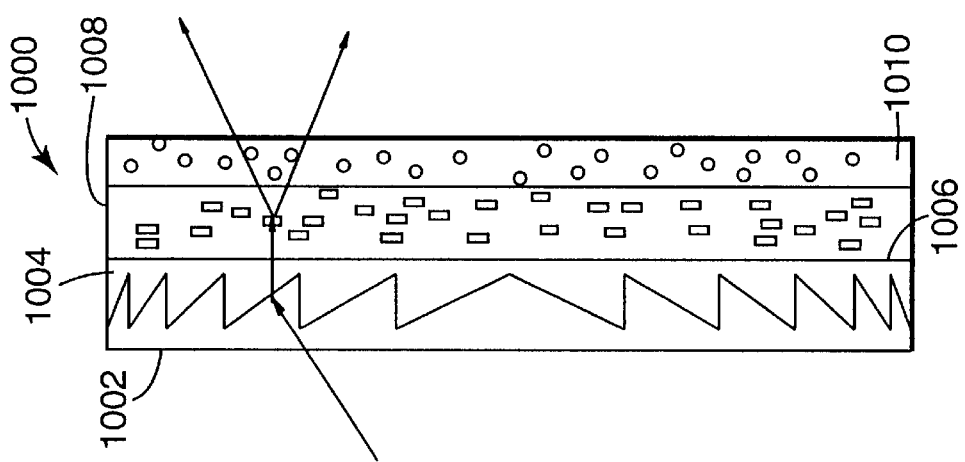

Another embodiment of a screen assembly is illustrated in FIG. 10B. The assembly 1020 includes a polarization-sensitive, diffusely transmitting optical device 1022 attached to a scattering device substrate layer 1024 to provide support to the scattering optical device 1022. The assembly also includes a linear polarizing layer 1026 oriented to transmit light of the polarization that is diffusely transmitted through the polarization-sensitive, diffusely transmitting optical device 1022. The polarizing layer 1026 prohibits transmission of light having the orthogonal polarization.

The figure shows incoming ray 1032, which may be unpolarized, or may contain a mixture of different polarization components. One polarization component of the incoming ray 1032 is of the polarization that is diffusely scattered by the polarization sensitive scattering optical device 1022, and is diffusely transmitted as ray 1034. Light having the orthogonal polarization may be transmitted by the polarization-sensitive, diffusely transmitting scattering optical device 1022. For example, it may be specularly transmitted as ray 1036. The light ray 1036 is absorbed in the polarizing layer 1026. Therefore, the polarizing layer 1026 transmits only that component 1034 of the incident light which is diffusely transmitted by the polarization-sensitive scattering optical device 1022. This is useful in enhancing screen contrast by reducing the transmission of light having the undesired polarization through the device 1022 to the viewer's side. The polarizing layer 1026 is also useful for reducing the reflection of ambient light incident on the device 1022 from the viewer's side, thus further increasing screen contrast.

The optical device 1022 may also diffusely transmit the light polarized orthogonally to the polarization of light ray 1034. The polarizing layer 1026 may also be useful to prevent transmission through the screen 1020 of light polarized orthogonally to the polarization of light ray 1034.

The polarizing optical device may be attached to a glass sheet 1028 for support. Each layer 1022, 1024, 1026, and 1028 may be laminated onto the other layer, adhered to another layer using, for example, an optically transparent adhesive, or attached to the other layers by some other method.

Different screen assemblies using polarization-sensitive scattering layers are described below, along with some measured characteristics. These examples demonstrate that polarization-sensitive, diffusely transmitting layers may be used effectively for rear-projection screens.

EXAMPLE 1

Thermoplastic Beads Dispersed in a Thermoplastic Binder

A polarization-sensitive scattering optical device was made by extruding a mixture of 10 wt % of polymethylmethacrylate (PMMA) beads in Questra MA405® available from Dow Chemical Company at 270° C. The PMMA beads had a mean diameter of 5 $\mu$m and had a refractive index of $n_p$=1.49. A portion of the extruded optical device was stretched by a factor of four times in the down-web direction at 125° C., changing the refractive index of the Questra continuous phase. The stretched optical device showed that the PMMA particles became elongated in the stretched direction. The polarization-sensitive scattering optical device has viewing angles of 3° and 8° in the x-axis (stretched) and y-axis (unstretched) directions, respectively. Due to the high extrusion temperature, some of the PMMA beads became agglomerated, thus reducing the scattering effect of this optical device.

EXAMPLE 2

Partially Crosslinked Beads Dispersed in a Thermoplastic Binder

A polarization-sensitive scattering optical device was made by extruding a mixture of 40 wt % of modified (partially cross-linked) PMMA beads. The modifier was Plexiglas 'L' Modifier available from AutoHaas, Philadelphia, Pa. The PMMA beads had a mean diameter of 7 $\mu$m and a refractive index of $n_p$=1.46. The continuous phase was a PMMA resin (Plexiglas DR-100, n=1.49 from AutoHaas, Philadelphia, Pa). Extrusion took place at a temperature of 22° C. A portion of the extruded film was stretched by a 30% in one direction at a temperature of 105° C. to form a 7-mil thick polarization-sensitive scattering optical device. An examination of the resulting optical device by SEM showed that the particles became elongated along the stretched direction. The diffuser has a peak gain of 12.5, and a viewing angles of 8° and 11° in the x-(stretched) and y-axis directions, respectively.

EXAMPLE 3

Polymer Beads Dispersed in Birefringent Resin

A polarization-sensitive scattering optical device was made by extruding a mixture of 15 wt % of crosslinked styrene-divinyl benzene copolymer beads in Questra MA405® at 270° C. The beads were formed from SBX-6 material available from Nagase America, New York, N.Y. The beads had a mean diameter of 6 $\mu$m and a refractive index of $n_p$=1.59. The refractive index of clear syndiotactic polystyrene optical device decreases from 1.58 to 1.53 in the x-direction and increases to 1.61 in the y-direction when stretched in the x-direction at 125° C. A sample of the extruded diffuser optical device was stretched by a factor of 1.5 times in the x-direction at 125° C. to form a 175 μmil thick polarization-sensitive scattering optical device. The optical device manifested viewing angles of 14° and 26° in the x-(stretched) and y-axis directions, respectively.

EXAMPLE 4

Phase Separated Polystyrene Particles in a Birefringent Resin

In Example 4, a three layer optical film was made in accordance with the present invention utilizing conventional three layer coextrusion techniques. The film had a core layer and a skin layer on each side of the core layer. The core layer was formed from a blend of 88 wt % of a first copolyester, 10 wt % syndiotactic polystyrene, and 2 wt % Dylark®332-80. The first copolyester was a copolymer based on 70 mole % naphthalene dicarboxylate and 30 mole % dimethyl terephthalate. The first copolyester had an intrinsic viscosity of about 0.56 measured in 60% phenol, 40% dicholorobenzene. The syndiotactic polystyrene was a copolymer based on 93 mole % styrene and 7 mole % para-methyl styrene and had a molecular weight of 250,000 Dalton. The syndiotactic polystyrene was obtained from the Dow Chemical Company.

The skin layers were formed from a second copolyester. The second copolyester was based on 70 mole % naphthalene dicarboxylate and 30 mole % dimethyl isophthalate. The second copolyester had an intrinsic viscosity of about 0.48 measured in 60% phenol, 40% dicholorobenzene.

Example 4 was stretched 5 to 1 in the transverse direction on a conventional polyester line at 118° C. The final film, after stretching, was 120 μm thick. The film exhibited a single pass transmission of 84.3% for linearly polarized light whose polarization was coincident with the machine direction of the film. The single pass transmission was 47.8% for linearly polarized light whose polarized light whose polarization was coincident with the transverse direction of the film.

Peak gain (PG) and viewing angle (VA) were measured using polarized light parallel to each of the machine direction (MD) and the transverse direction (TD), and the results are summarized in Table I.

TABLE I

Gain and Viewing Angle Measurements

| TD PG | TD VA | MD PG | MD VA |
|---|---|---|---|
| 1.89 | 43° | 1.94 | 1.2° |

A symmetrical diffuser with a viewing angle of 22° was laminated to the surface opposite the incident light and the peak gains and viewing angles were remeasured. Qualitative characterizations were also made for diffusion, color, and speckle. The results of the measurements and the quantitative characterizations are summarized in Table II.

TABLE II

Gain and Viewing Angle Measurements

| TD PG | TD VA | MD PG | MD VA | Diffusion | Color | Speckle |
|---|---|---|---|---|---|---|
| 0.65 | 68° | 0.65 | 50° | Excellent | Excellent | Excellent |

EXAMPLES 5 and 6

Phase Separated Polystyrene Particles in a Birefringent Resin

Examples 5 and 6 were made using the same technique as described for Example 4 with the exception of the orientation temperature. Examples 5 and 6 were oriented at 130° C. and 135° C., respectively. Examples 5 and 6 exhibited single pass transmission values of 87.5% and 87.3%, respectively, for linearly polarized light whose polarization was coincident with the machine direction of the film. Examples 5 and 6 exhibited single pass transmission values of 59.6% and 62.3%, respectively, for linearly polarized light whose polarization was coincident with the transverse direction of the film.

Examples 5 and 6 were characterized according to the methods used in Example 4, and the results are summarized in Table III.

TABLE III

Gain and Viewing Angle Measurements

| Ex. | Diffuser | TD PG | TD VA | MD PG | MD VA | Diffusion | Color | Speckle |
|---|---|---|---|---|---|---|---|---|
| 5 | No | 6.39 | 23° | 6.35 | 6° | — | — | — |
| 5 | Yes | 1.12 | 46° | 1.13 | 30° | Excellent | Excellent | Good |
| 6 | No | 8.82 | 20° | 8.85 | 5° | — | — | — |
| 6 | Yes | 1.25 | 42° | 1.25 | 28° | Excellent | Excellent | Good |

Examples 4 through 6 demonstrate that the approach discussed herein may be used to produce a light dispersing film that has significant asymmetric light dispersing properties. Such a film may optionally be combined with a symmetrical diffuser. The resulting structure has been shown to exhibit excellent diffusion, color, and speckle properties.

As noted above, the present invention is applicable to rear projection screens, and is believed to be particularly applicable to screens used in applications requiring an asymmetric viewing angle. The invention is also useful for providing a user with the ability to tune to a desired viewing angle or optical gain.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A rear projection system, comprising
    a light source, projecting light having a polarization parallel to a source polarization direction;
    a transmission screen disposed to receive light from the light source, the transmission screen having a first scattering layer with a first scattering distribution for light having a polarization parallel to a first screen polarization axis and a second scattering distribution for light having a polarization parallel to a second screen polarization axis orthogonal to the first polarization axis, an angle between the first polarization axis and the source polarization direction being selected to be greater than 0° and less than 90°.

2. A rear projection system as recited in claim 1, wherein the light source is an image light source projecting an image of polarized light towards the transmission screen.

3. A rear projection system as recited in claim 1, wherein the scattering transmission screen includes a polymeric matrix layer embedded with discrete bodies, a difference in refractive index between the discrete bodies and the polymeric matrix layer for light having a polarization parallel to the first scattering axis being different from a difference in refractive index between the discrete bodies and the polymeric matrix layer for light having a polarization parallel to the second scattering axis.

4. A rear projection system as recited in claim 2, wherein the polymeric matrix layer is birefringent.

5. A rear projection system as recited in claim 2, wherein the discrete bodies are birefringent.

6. A rear projection system as recited in claim 2, wherein the discrete bodies are formed from a polymeric material.

7. A rear projection system as recited in claim 2, wherein the discrete bodies are aligned substantially parallel to a common axis.

8. A rear projection system as recited in claim 1, wherein a first viewing angle defined for light scattered, in the first scattering distribution, in a direction along the first polarization axis is different from a second viewing angle for light scattered, in the first scattering distribution, in a direction along the second polarization axis.

9. A rear projection system as recited in claim 1, wherein the transmission screen further includes a second scattering layer disposed to scatter light passing through the first scattering layer, the second scattering layer having a third scattering distribution that is independent of a polarization direction of light passing through the second scattering layer.

10. A rear projection system as recited in claim 1, wherein the transmission screen further includes a diffusing surface provided on a layer of the transmission screen to diffuse light passing through the diffusing surface from the image light projector.

11. A rear projection system as recited in claim 1, further comprising a Fresnel lens on an input side of the transmission screen, facing the light source, to change divergence of light reaching the transmission screen from the light source.

12. A rear projection system as recited in claim 1, wherein the transmission screen further includes a polarizer layer oriented to transmit light transmitted through the first scattering layer, which is polarized parallel to the source polarization direction, and to prohibit transmission of light transmitted through the first scattering layer and which is polarized perpendicular to the source polarization direction.

13. A rear projection system as recited in claim 1, wherein the transmission screen is rotatable and the angle between the first polarization axis and the source polarization direction is rotatably selectable between 0° and 90°.

14. A rear projection system, comprising
   a light source, projecting light having a polarization parallel to a source polarization direction; and
   a transmission screen disposed to receive light from the light source, the transmission screen including a first scattering layer with a first scattering distribution for light having a polarization parallel to a first screen polarization axis and a second scattering distribution for light having a polarization parallel to a second screen polarization axis orthogonal to the first polarization axis, the transmission screen also including a polarizing layer oriented to transmit light polarized parallel to the source polarization direction, and to prohibit transmission of light polarized perpendicular to the source polarization direction.

15. A rear projection system as recited in claim 14, wherein the light source is an image light source projecting an image of polarized light towards the transmission screen.

16. A system as recited in claim 14, wherein the first scattering layer substantially specularly transmits light having a polarization direction perpendicular to the source polarization direction.

17. A system as recited in claim 14, wherein the scattering transmission screen includes a polymeric matrix layer embedded with discrete bodies, a difference between refractive indices of the discrete bodies and the polymeric matrix layer for light having a polarization parallel to the first scattering axis being different from a difference between refractive indices of the discrete bodies and the polymeric matrix layer for light having a polarization parallel to the second scattering axis.

18. A system as recited in claim 17, wherein the polymeric matrix layer is birefringent.

19. A system as recited in claim 17, wherein the discrete bodies are birefringent.

20. A system as recited in claim 17, wherein the discrete bodies are formed from a polymeric material.

21. A system as recited in claim 17, wherein the discrete bodies are aligned substantially parallel to a common axis.

22. A system as recited in claim 14, wherein dispersion of light transmitted through the screen is asymmetric.

23. A system as recited in claim 14, wherein the transmission screen further includes a second scattering layer disposed to scatter light passing through the first scattering layer, the second scattering layer having a third scattering distribution that is independent of a polarization direction of light passing through the second scattering layer.

24. A system as recited in claim 14, wherein the transmission screen further includes a dispersing surface provided on a layer of the transmission screen to disperse light passing through the dispersing surface from the light source.

25. A system as recited in claim 14, further comprising a Fresnel lens positioned on an input side of the transmission screen, facing the light source, to change divergence of light reaching the first scattering layer from the light source.

26. A system as recited in claim 14, wherein an angle between the first polarization axis and the source polarization direction is selected to be greater than 0° and less than 90°.

27. A display device, comprising:
   a light source, projecting light having a polarization parallel to a source polarization direction; and
   a transmission screen disposed to receive light from the light source, the transmission screen having a first scattering layer with a first scattering distribution for light having a polarization parallel to a first screen polarization axis and a second scattering distribution for light having a polarization parallel to a second screen polarization axis orthogonal to the first scattering axis, the first scattering layer being rotatably mounted in the display device;
   wherein rotation of the first scattering layer results in a variation of an angle between the first polarization axis and the source polarization direction.

28. A display device as recited in claim 27, wherein the first scattering layer includes a polymeric matrix layer embedded with discrete bodies, a difference between refractive indices of the discrete bodies and the polymeric matrix layer for light having a polarization parallel to the first polarization axis being different from a difference between refractive indices of the discrete bodies and the polymeric matrix layer for light having a polarization parallel to the second polarization axis.

29. A display device as recited in claim 27, wherein the transmission screen further includes a second scattering layer disposed to disperse light passing through the first scattering layer, the second scattering layer having a third scattering distribution that is independent of polarization of light passing through the second scattering layer.

30. A display device as recited in claim 27, wherein the transmission screen further includes a dispersing surface provided on a layer of the transmission screen to disperse light passing through the dispersing surface from the image light projector.

31. A display device as recited in claim 27, further comprising a Fresnel lens on an input side of the transmission screen, facing the light source, to change divergence of light reaching the first scattering layer from the light source.

32. A rear projection system as recited in claim 27, wherein the light source is an image light source projecting an image of polarized light towards the transmission screen.

* * * * *